Jan. 13, 1931.   A. C. ARMSTRONG   1,789,280
MUNTIN BAR
Filed May 26, 1928
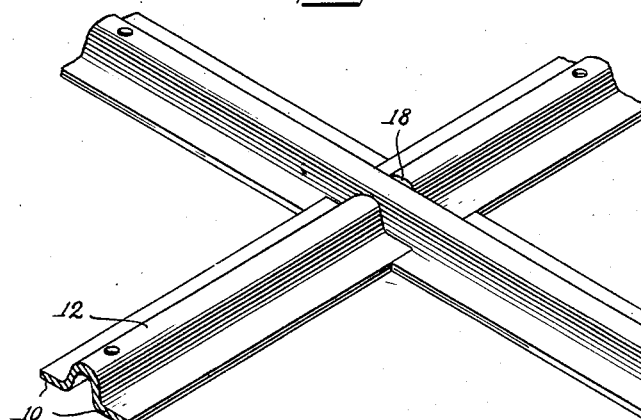
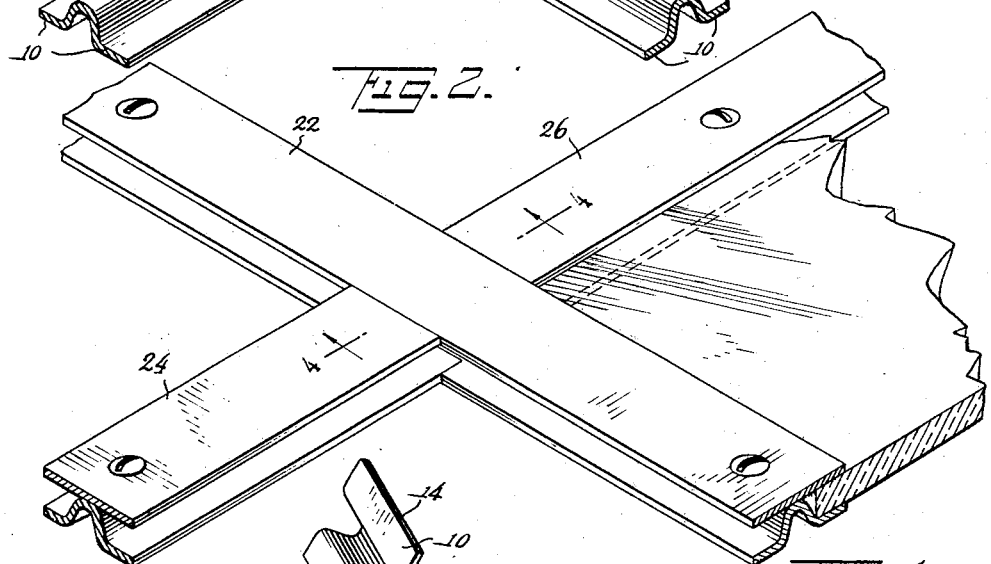
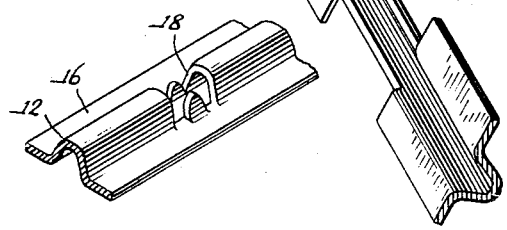
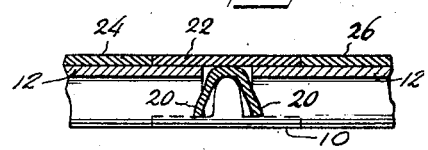
INVENTOR
Addison C. Armstrong
BY
ATTORNEY Patented Jan. 13, 1931

1,789,280

UNITED STATES PATENT OFFICE

ADDISON C. ARMSTRONG, OF BALTIMORE, MARYLAND, ASSIGNOR TO CAMPBELL METAL WINDOW CORPORATION, OF BALTIMORE, MARYLAND, A CORPORATION OF MARYLAND

MUNTIN BAR

Application filed May 26, 1928. Serial No. 280,779.

This invention relates to a method whereby muntin bars may be caused to intersect without breaking either bar at the intersection point and whereby the bars may be cheaply and firmly locked together.

An illustrative example of the invention is shown in the accompanying drawings in which Fig. 1 is a perspective view showing the intersecting muntin bars connected together, but with the glass stops removed; Fig. 2 is a corresponding view showing glass stops in place; Fig. 3 is a perspective view showing portions of two bars as they are about to be assembled, and Fig. 4 is a sectional view on line 4—4 of Fig. 2 illustrating the method of locking the bars together.

The muntin bars are made of uniform cross section from flat metal plates. These plates are bent by rolling or any other appropriate means to leave flat portions 10 connected together by a U-shaped portion 12. At points of intersection one bar (which is the bar 14 shown in Fig. 3) has the flat portions 10 cut away for a distance exactly equal to the total width of the muntin bar. The other bar 16 has formed through its U-shaped portion, a notch 18 adapted to receive the U-shaped portion 12 of bar 14. When bar 14 is placed over the bar 16 its U-shaped portion 12 will enter the notch 18 and the flat portions 10 of bar 16 will fill the cut out space in bar 14 as illustrated in Fig. 1. The bars thus in place are turned over, and the walls of U-shaped portion 12 of bar 14 which lie in notch 18 are bent apart as indicated at 20 in Fig. 4, whereby the two pieces are firmly locked together. This bending can readily be done by the use of any blunt instrument of appropriate shape. Any cracks or openings will be filled by paint or by the putty which is inserted when the window is glazed. The glass stops are preferably not made continuous but those running in one direction butt against those running in the other direction; for example, as shown in Fig. 2 glass stop 22 is continuous and the ends of glass stops 24 and 26 butt up against the sides of glass stop 22.

By this construction intersecting muntin bars of great strength and rigidity can be fabricated at very little cost.

What I claim is:

A muntin bar construction comprising two intersecting bars each having a flat portion and a U-shaped portion, one of said bars having its flat portion cut away to receive the flat portion of the second bar, and the second bar having its U-shaped portion cut away to receive the U-shaped portion of the first bar and said first bar having the sides of its U-shaped portion spread apart in between the sides of the U-shaped portion of the second bar to lock the bars together.

ADDISON C. ARMSTRONG.